United States Patent
Mizuno et al.

(10) Patent No.: US 7,458,276 B2
(45) Date of Patent: Dec. 2, 2008

(54) MAGNETOSTRICTIVE LOAD SENSOR

(75) Inventors: Yutaka Mizuno, Shizuoka (JP); Yoshinori Harada, Shizuoka (JP); Satomi Ishikawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 176 days.

(21) Appl. No.: 11/148,727

(22) Filed: Jun. 9, 2005

(65) Prior Publication Data
US 2005/0274195 A1   Dec. 15, 2005

(30) Foreign Application Priority Data
Jun. 14, 2004   (JP)   ............... 2004-176225

(51) Int. Cl.
*G01B 7/16*   (2006.01)
*G01L 1/00*   (2006.01)

(52) U.S. Cl. .................................................. 73/779
(58) Field of Classification Search .................... 73/779
See application file for complete search history.

(56) References Cited

U.S. PATENT DOCUMENTS

| | | | |
|---|---|---|---|
| 3,304,479 A | | 2/1967 | Kleesattel et al. |
| 5,739,600 A | * | 4/1998 | Kobayashi et al. ............ 310/26 |
| 6,237,428 B1 | * | 5/2001 | Odachi et al. .......... 73/862.333 |
| 6,484,592 B2 | * | 11/2002 | Sezaki ................... 73/862.335 |
| 6,622,577 B1 | | 9/2003 | Uras |
| 6,762,663 B2 | | 7/2004 | Andoh et al. |
| 6,941,824 B2 | * | 9/2005 | Morelli et al. ............ 73/862.69 |
| 7,320,251 B2 | * | 1/2008 | Harada et al. ................. 73/779 |
| 2004/0107777 A1 | * | 6/2004 | Lequesne et al. .............. 73/779 |
| 2004/0169573 A1 | | 9/2004 | Andoh et al. |

FOREIGN PATENT DOCUMENTS

| | | |
|---|---|---|
| GB | 410 629 A | 5/1934 |
| JP | 2002-313205 | 10/2002 |
| JP | 2003-057128 | 2/2003 |
| JP | 2004-045047 A | 2/2004 |

* cited by examiner

*Primary Examiner*—Edward Lefkowitz
*Assistant Examiner*—Octavia Davis
(74) *Attorney, Agent, or Firm*—Keating & Bennett, LLP

(57) ABSTRACT

A magnetostrictive load sensor includes an upper casing, a lower casing, a coil, and a bobbin. The upper casing having an approximate bell shape has an upper end that is provided with an opening and a lower end that is provided with a notch. The lower casing includes a disk-shaped member and a bar-shaped member that are integral with each other. The coil is formed by winding a conducting wire around the bobbin. A predetermined position of the bobbin is provided with a lead wire outlet for taking out the conducting wire of the coil. A method of manufacturing the magnetostrictive load sensor includes inserting the bar-shaped member into the axial center of the bobbin, and covering the lower casing with the upper casing. In this way, the notch of the upper casing and the lead wire outlet of the bobbin are fitted with each other. An upper end of the bar-shaped member projects through the opening of the upper casing.

16 Claims, 10 Drawing Sheets

F I G. 1
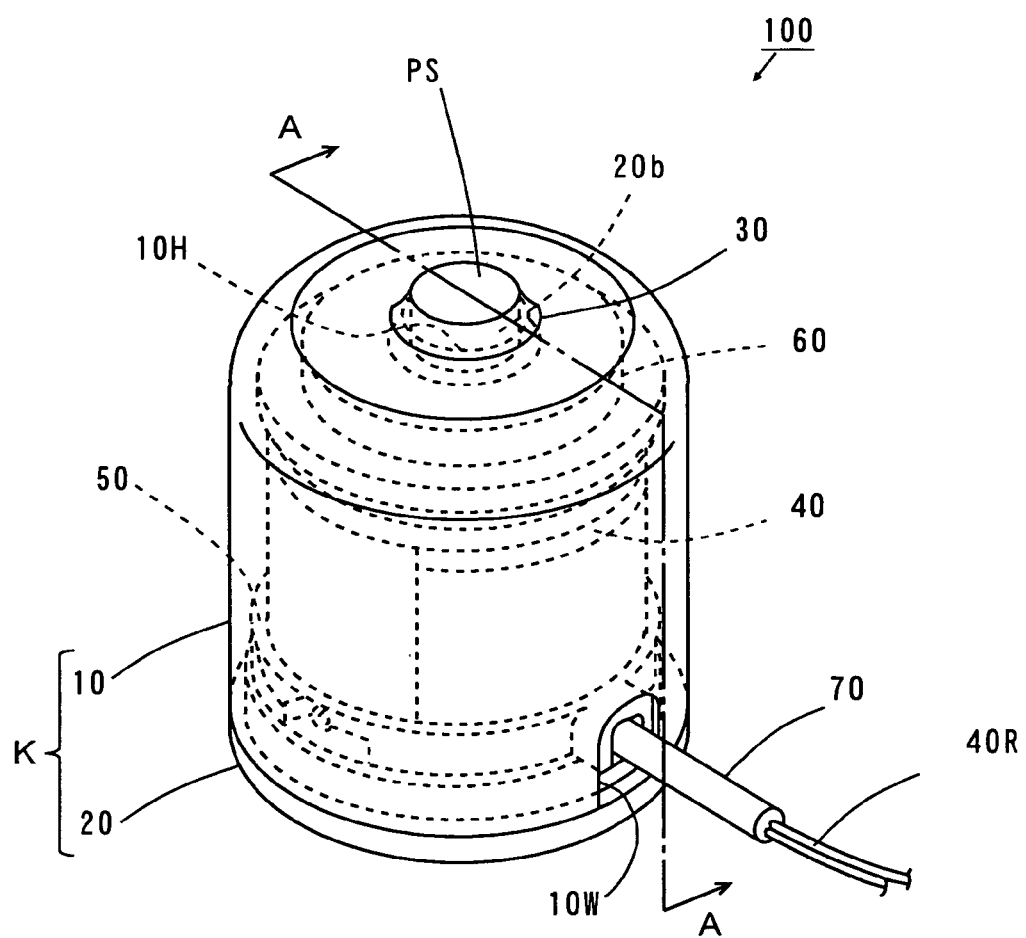

MAGNETOSTRICTIVE LOAD SENSOR

BACKGROUND OF THE INVENTION

1. Field of the Invention

The present invention relates to magnetostrictive load sensors for electromagnetically detecting a load through the magnetostrictive effect.

2. Description of the Background Art

Magnetostrictive load sensors have conventionally been developed as sensors for detecting a load. A magnetostrictive load sensor detects a load by converting a change in the magnetic properties of a member to which the load is applied into a change in voltage, and outputting the change in voltage (refer to, e.g., JP 2003-57128).

A magnetostrictive load sensor according to JP 2003-57128 includes a sheet metal case, a detecting rod of a magnetic material, and a coil that is wound around a bobbin.

The case includes an upper case having an approximate bell shape and a receiving case having an approximate disk shape. The upper case is provided with an opening through an upper end, and also provided with a case flange extending around a lower end. An outer periphery of the receiving case is provided with four cut and raised portions at equal distances.

The detecting rod has a bar-shaped portion that extends in the vertical direction, and a rod flange that is formed around a lower end. The bar-shaped portion and the rod flange are integral with each other. A central portion of the bobbin that is wound with the coil is provided with a through hole that extends vertically along the axial center of the coil.

A method of manufacturing this magnetostrictive load sensor includes inserting the detecting rod into the through hole in the bobbin, arranging the rod flange of the detecting rod at a predetermined position (approximate center) of the receiving case, and covering the receiving case with the upper case. The case flange of the upper case thus comes in contact with the outer periphery of the receiving case. The upper end of the bar-shaped portion of the detecting rod projects upwardly through the opening of the upper end of the upper case.

In this state, the four cut and raised portions of the receiving case are bent onto the case flange of the upper case and caulked. In this way, the receiving case and the upper case are secured to each other.

The lower end of the upper case is provided with a notch. A cylindrical cover is formed at this notch which extends a predetermined length in a side direction of the case.

An outlet of a lead wire pulled from the coil inside the case is extended outside the case through the inside of the cover, in order to prevent a reduction in magnetic resistance and external disturbances. The lead wire outlet is thus shielded with the cover, and prevented from breakage and damage.

A magnetic switch for a starter according to JP 2002-313205 also adopts such a structure in which a lead wire that is pulled from a coil inside a case extends outside the case. In the magnetic switch for a starter, a terminal that is connected to the lead wire of an exciting coil is extended outside a switch case through the inside of a molded cover, which is connected so as to extend in a predetermined direction from the switch case.

In the aforementioned conventional magnetostrictive load sensor, the detecting rod is magnetized by flow of a current through the coil. In this state, application of a load to the upper end of the detecting rod causes deformation of the detecting rod and a change in the magnetic properties.

The change in the magnetic properties of the detecting rod subsequently appears as a change in the voltage generated across the coil. This enables a detection of the load that is applied to the detecting rod based on the change in the voltage across the coil.

In such magnetostrictive load sensors, a shift in the positions of a detecting rod and a coil inside a case causes variations in the sensitivities of the magnetostrictive load sensors. This reduces accuracy of load detection by the magnetostrictive load sensors, and reduces the reliability. Therefore, the detecting rod and the coil have to be positioned accurately inside the case.

However, there is a possibility that the rod flange is shifted from the predetermined position on the receiving case when the cut and raised portions are bent and caulked with the rod flange being arranged on the predetermined position of the receiving case.

The operation of securing the receiving case and the upper case by caulking, with care so as not to cause the rod flange to shift from its position, is very difficult and requires much skill. This makes the mass-production of magnetostrictive load sensors difficult.

Further, since the cover body for allowing the lead wire of the coil to extend outside the case has a longitudinal shape, it is difficult to reduce the size of a magnetostrictive load sensor.

SUMMARY OF THE INVENTION

In order to overcome the problems described above, preferred embodiments of the present invention provide a magnetostrictive load sensor that is reliable and easy to manufacture, and a magnetostrictive load sensor that is reliable, easy to manufacture, and smaller in size.

A magnetostrictive load sensor according to a preferred embodiment of the present invention includes a coil with a through hole, a bar-shaped member having a first end arranged to receive a load that is inserted into the through hole of the coil, and made of a magnetic material, a base that is integrally disposed on a second end of the bar-shaped member so as to support the coil, and a casing member that is fitted into the base so as to house the coil, and has an opening that allows the first end of the bar-shaped member to receive a load.

In the magnetostrictive load sensor, a magnetic field is generated by flow of a current through the coil. This magnetizes the bar-shaped member made of a magnetic material. When the first end of the bar-shaped member receives a load through the opening in the casing member, the bar-shaped member is distorted. This causes a change in the inductance of the coil, causing a change in the voltage that is induced across the coil. This enables a detection of the load based on the change in the voltage.

The bar-shaped member with the first end arranged to receive a load is integrally disposed on the base so as to support the coil. This allows the bar-shaped member to be accurately and easily inserted into a predetermined position of the through hole of the coil during the assembly of the magnetostrictive load sensor. Manufacture of the magnetostrictive load sensor is thus simplified.

In addition, since the bar-shaped member is integrally disposed on the base that supports the coil, the bar-shaped member and the coil supported on the base are prevented from shifting from their respective positions during a press fitting of the casing member with the base.

This reduces the variations in the sensitivities of magnetostrictive load sensors, and therefore improves the accuracy of load detection by the magnetostrictive load sensors. As a result, high reliability is provided.

The base and the casing member preferably may each be made of a magnetic material, and function as a magnetic path of a magnetic field that is generated by the coil.

In this case, a magnetic field is generated by flow of a current through the coil. This magnetizes the bar-shaped member while magnetizing the base and the casing member, each being made of a magnetic material. The base and the casing member thus function as the magnetic path. This improves the sensitivity of the magnetostrictive load sensor.

A portion of the casing member that is fitted with the base may be provided with a notch allowing communication between an inside and an outside of the casing member. This reduces the load required to fit the casing member with the base. This facilitates fitting the casing member with the base. As a result, manufacture of the magnetostrictive load sensor is simplified.

Moreover, residual stress that is generated in the portion of the casing member fitted with the base is reduced. This reduces the magnetic resistance of the portion of the casing member fitted with the base. As a result, the sensitivity of the magnetostrictive load sensor is improved.

In addition, a reduced residual stress in the portion of the casing member fitted with the base reduces the change in the magnetic properties of the casing member. Therefore, variations in the sensitivities of magnetostrictive load sensors are reduced.

Further, the conducting wire that is pulled from the coil can be easily extended out of the casing member from the inside of the casing member through the notch.

A length of the notch in a first direction that is substantially parallel to the bar-shaped member may be longer than a length of the notch in a second direction that is substantially perpendicular to the first direction.

When the length of the notch in the first direction is longer than the length of the notch in the second direction, the cross section area of the casing member defining the magnetic path is increased. This reduces the change in the magnetic properties of the casing member due to the formation of the notch. As a result, the sensitivity of the magnetostrictive load sensor is improved.

The coil may include a bobbin with a flange that is supported on the base, and a conducting wire that is wound around the bobbin, the flange of the bobbin may have a conducting wire outlet that defines a passage through which the conducting wire extending from the coil is directed to the outside of the casing member, and the conducting wire outlet may be formed so as to fit into the notch.

In this case, during the press fit of the casing member with the base, the conducting wire outlet on the flange of the bobbin is fitted into the notch of the casing member. The conducting wire that extends from the coil is directed to the outside through the passage formed by the conducting wire outlet.

This prevents disconnection of the conducting wire that extends from the coil during the press fit of the casing member with the base. In addition, the conducting wire of the coil is directly taken out of the casing member without passing through a pin, thus resulting in a smaller size of the magnetostrictive load sensor.

The flange may have a guide groove that guides the conducting wire to the passage of the conducting wire outlet. In this case, the conducting wire that extends from the coil is guided to the passage of the conducting wire outlet through the guide groove. This prevents disconnection of the conducting wire that extends from the coil during the press fit of the casing member with the base.

The magnetostrictive load sensor may further include a sheathing tube that covers at least a region of the conducting wire that passes through the guide groove and the passage of the conducting wire outlet. In this case, at least the region of the conducting wire pulled from the coil which passes through the guide groove and the passage of the conducting wire outlet is covered with the sheathing tube. This prevents disconnection of the conducting wire that extends from the coil.

The portion of the casing member that is fitted with the base may be provided with one or a plurality of slits. This reduces the load required to fit the casing member with the base. This facilitates fitting the casing member with the base. As a result, manufacture of the magnetostrictive load sensor is simplified.

Moreover, residual stress that is generated in the portion of the casing member fitted with the base is reduced. This reduces the magnetic resistance of the portion of the casing member fitted with the base. As a result, the sensitivity of the magnetostrictive load sensor is improved.

In addition, a reduced residual stress in the portion of the casing member fitted with the base reduces the change in the magnetic properties of the casing member. Therefore, variations in the sensitivities of magnetostrictive load sensors are reduced.

The portion of the casing member that is fitted with the base may be provided with a plurality of slits, and the plurality of slits may be formed at equal distances. This reduces the load required to fit the casing member with the base. This facilitates fitting the casing member with the base. As a result, manufacture of the magnetostrictive load sensor is simplified.

Moreover, residual stress that is generated in the portion of the casing member fitted with the base is reduced. This reduces the magnetic resistance of the portion of the casing member fitted with the base. As a result, the sensitivity of the magnetostrictive load sensor is improved.

In addition, a reduced residual stress in the portion of the casing member fitted with the base reduces the change in the magnetic properties of the casing member. Therefore, variations in the sensitivities of magnetostrictive load sensors are reduced.

Further, the formation of the plurality of slits at equal distances makes the load acting on the portion of the casing member fitted with the base uniform. This prevents deformation of the casing member during the press fit of the casing member with the base.

The bar-shaped member may have on the second end thereof an expanded portion with a cross section that gradually expands toward the base. In this case, a shift in the position of the coil is prevented by the expanded portion during the insertion of the bar-shaped member into the through hole of the coil in the assembly of the magnetostrictive load sensor. This allows the bar-shaped member to be inserted into the predetermined position of the through hole of the coil more accurately and easily.

An end of the through hole on a side of the expanded portion of the bar-shaped member may have a cross section that gradually expands toward the base. In this case, during the insertion of the bar-shaped member into the through hole of the coil in the assembly of the magnetostrictive load sensor, a shift in the position of the coil is prevented by the shape of the cross section of the through hole that expands gradually toward the base and the expanded portion of the bar-shaped member. This allows the bar-shaped member to be inserted into the predetermined position of the through hole of the coil even more accurately and easily.

A gap may be provided between an outer surface of the bar-shaped member and an inner surface of the through hole, and a largest cross section of the expanded portion of the bar-shaped member may have an equal size to that of a largest cross section of the through hole. In this case, during the insertion of the bar-shaped member into the through hole of the coil, the bar-shaped member is automatically positioned in the through hole of the coil such that the position of the expanded portion of the bar-shaped member with the largest cross section and the position of the through hole with the largest cross section coincide with each other. This facilitates positioning of the coil.

The magnetostrictive load sensor may further include an elastic cover that is attached to the casing member so as to cover the opening. In this case, the opening of the casing member is sealed off with the elastic cover, thus providing dust and water resistances to the magnetostrictive load sensor to improve the reliability thereof.

The magnetostrictive load sensor may further include an elastic member that is arranged between an inside end surface of the casing member and an end surface of the coil. This prevents the coil from shifting from its position during vibrations caused by the press fit of the base with the casing member. This ensures that the coil is not shifted from its position, thus resulting in a sufficient decrease in the variations of magnetostrictive load sensors. This also prevents disconnection of the conducting wire that is pulled from the coil. As a result, reliability of the magnetostrictive load sensor is sufficiently improved.

The casing member may be heat treated at a temperature higher than a heat treatment temperature for the bar-shaped member. When the casing member is made of a magnetic material, applying heat treatment to the casing member at a higher temperature than that for the bar-shaped member provides the casing member with a lower hardness than that of the bar-shaped member.

This reduces the load required to fit the casing member with the base, allowing a reduction in the residual stress generated in the portion of the casing member fitted with the base. Accordingly, the magnetic resistance of the portion of the casing member fitted with the base is reduced. As a result, the sensitivity of the magnetostrictive load sensor is improved.

Moreover, a reduced residual stress in the portion of the casing member fitted with the base reduces the change in the magnetic properties of the casing member. Therefore, variations in the sensitivities of magnetostrictive load sensors are reduced.

The foregoing and other elements, features, steps, characteristics, aspects and advantages of the present invention will become more apparent from the following detailed description of preferred embodiments with reference to the accompanying drawings.

BRIEF DESCRIPTION OF THE DRAWINGS

FIG. 1 is an external perspective view of a magnetostrictive load sensor according to a preferred embodiment of the present invention;

DETAILED DESCRIPTION OF PREFERRED EMBODIMENTS

A magnetostrictive load sensor according to a preferred embodiment of the present invention will be described below.

(1) General Configuration of Magnetostrictive Load Sensor

Figure 2A:
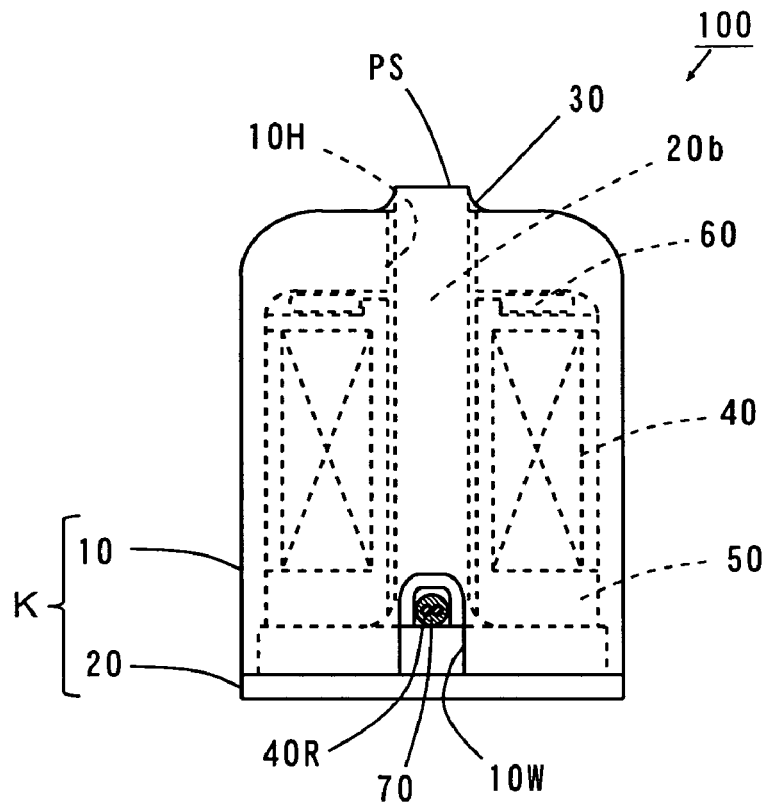
FIG. 2a is a side view of the magnetostrictive load sensor of FIG. 1.

FIG. 1 is an external perspective view of a magnetostrictive load sensor according to a preferred embodiment of the present invention. FIG. 2a is a side view of the magnetostrictive load sensor of FIG. 1, and FIG. 2b is a top view of the magnetostrictive load sensor of FIG. 1.

Figure 2B:
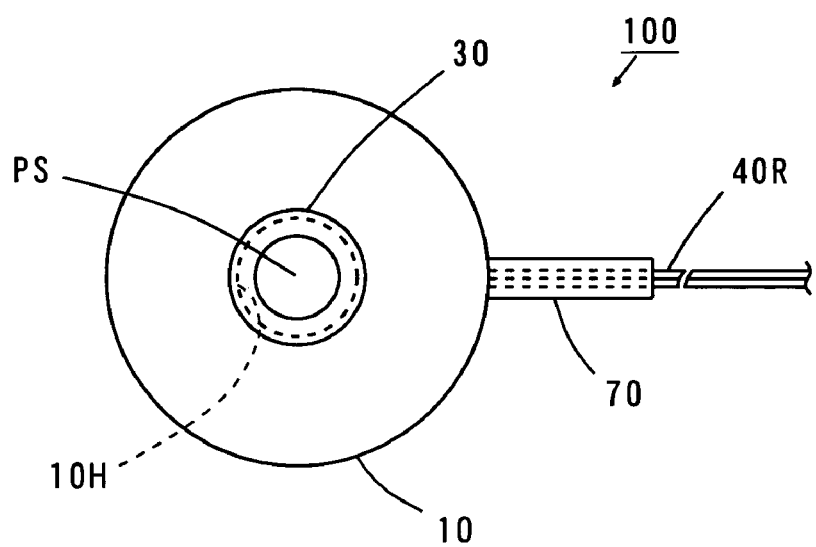
FIG. 2b is a top view of magnetostrictive load sensor of FIG. 1.

As shown in FIG. 1, FIG. 2a, and FIG. 2b, the magnetostrictive load sensor 100 in the preferred embodiment preferably includes a casing K that preferably includes an upper casing 10 and a lower casing 20 which houses a plurality of members described below. In FIG. 1 and FIG. 2a, the plurality of members housed in the casing K (a coil 40, a bobbin 50, and an elastic ring 60 described below) are indicated by the dotted lines.

The upper casing 10 preferably having an approximate bell shape is provided with an opening 10H through an upper end. A bar-shaped member 20b of the lower casing 20 described below is inserted into this hole 10H. The opening 10H has a greater diameter than that of the bar-shaped member 20b so that an upper end of the bar-shaped member 20b of the lower casing 20 projects upwardly from the upper end of the upper casing 10.

The elastic cover 30 is attached so as to cover the upper ends of the opening 10H and the bar-shaped member 20b of the lower casing. An approximate center of the elastic cover 30 thus projects upwardly along the shape of the bar-shaped member 20b that projects from the upper casing 10. This projecting surface serves as a pressure sensor PS for the load applied to the magnetostrictive load sensor 100.

A lower end of the upper casing 10 is provided with a notch 10W in a predetermined direction. A lead wire 40R is extended out from the inside of the casing K through the notch 10W. A predetermined region of the lead wire 40R at the outlet thereof is covered with a shrink tube 70. This will be discussed in detail below.

(2) Detailed Configuration of Magnetostrictive Load Sensor

Figure 3:
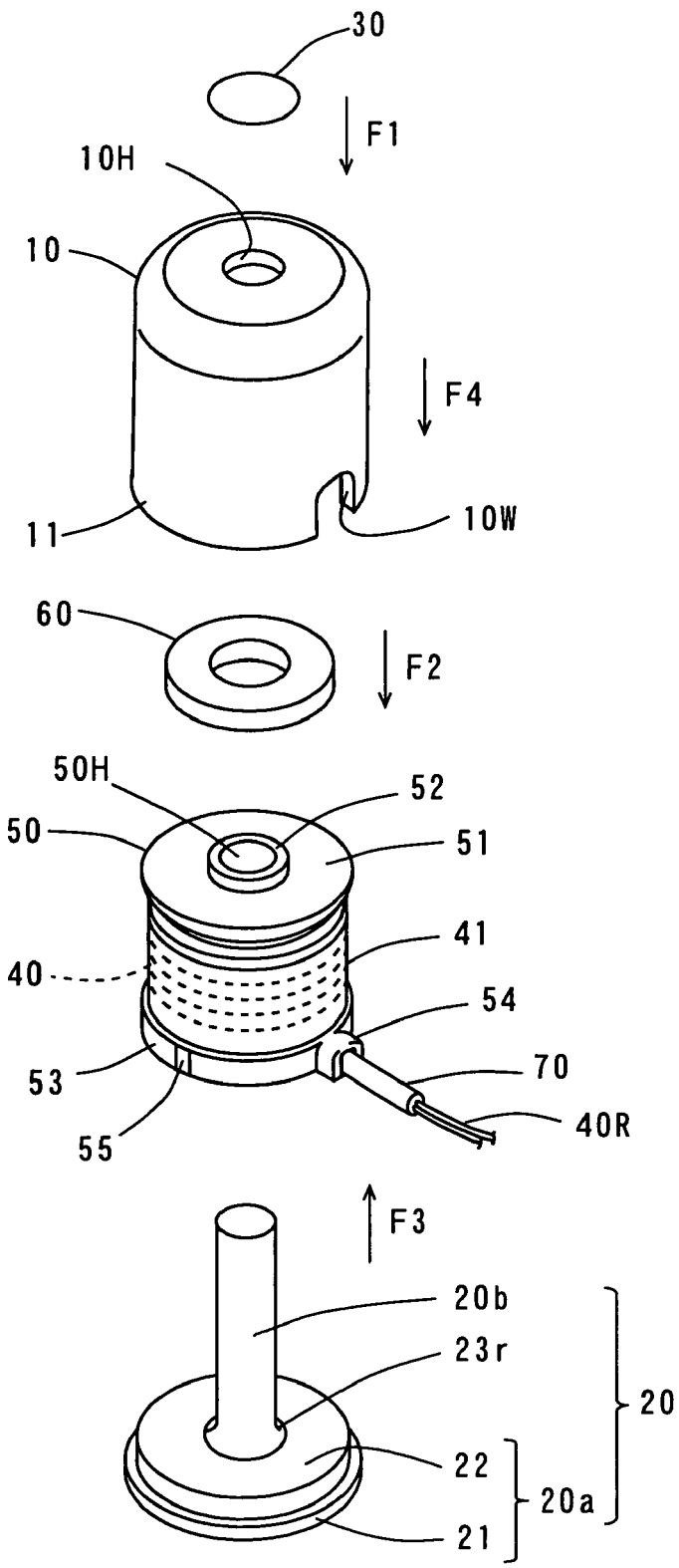
FIG. 3 is an assembly diagram of the magnetostrictive load sensor of FIG. 1.
Figure 4:
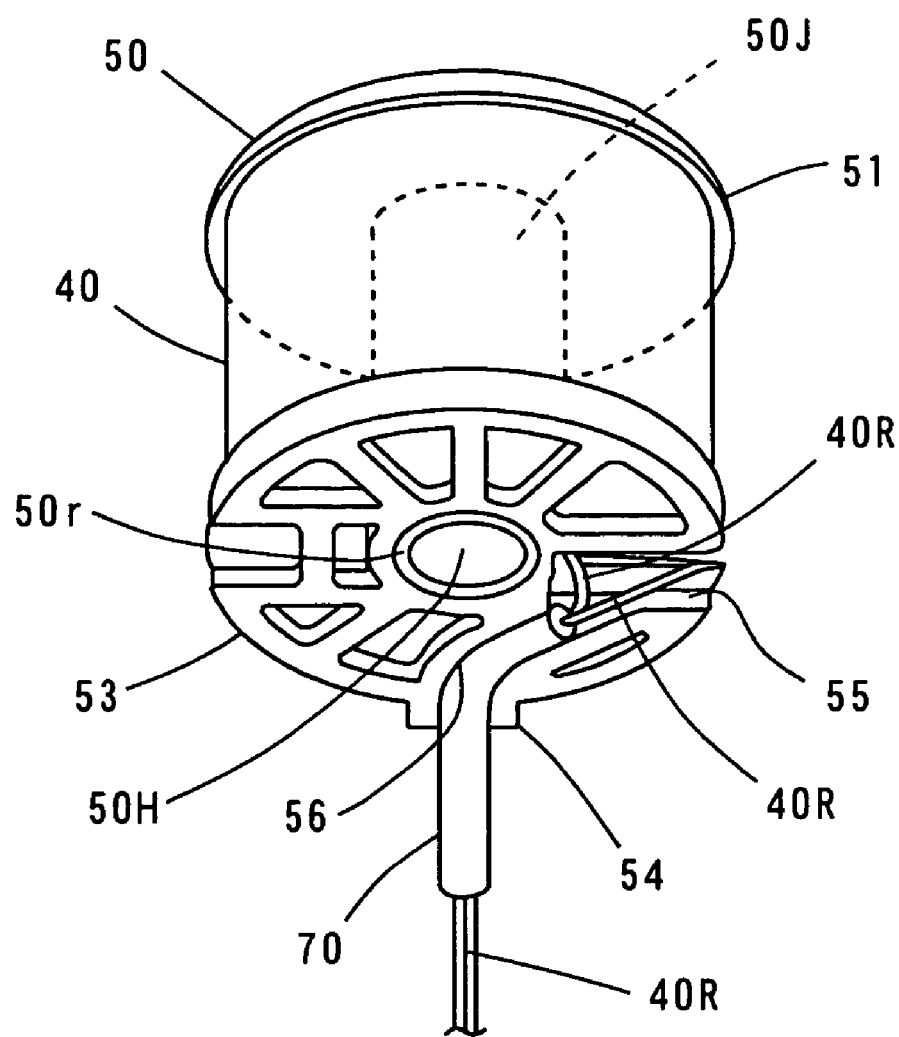
FIG. 4 is an external perspective view of the bobbin for use in the magnetostrictive load sensor of FIG. 1 which is viewed from the bottom.

The configuration of the magnetostrictive load sensor 100 and the assembly method thereof will now be described. FIG. 3 is an assembly diagram of the magnetostrictive load sensor 100 of FIG. 1. FIG. 4 is an external perspective view of the bobbin 50 for use in the magnetostrictive load sensor 100 of FIG. 1 which is viewed from the bottom.

As shown in FIG. 3, the magnetostrictive load sensor 100 includes an upper casing 10, a lower casing 20, an elastic cover 30, a coil 40, a bobbin 50, and an elastic ring 60.

As described above, the upper casing 10 preferably has an approximate bell shape. The upper end of the upper casing 10 is provided with an opening 10H, and the lower end of the upper casing 10 is provided with a notch 10W. The circumferential length of the notch 10W is preferably shorter than the vertical length thereof. The upper casing 10 except the notch 10W on the lower end serves as a casing press-fit portion 11.

Examples of material for use as the upper casing 10 include magnetic materials such as ferrous materials, ferrochrome-based materials, ferronickel-based materials, ferrocobalt-based materials, ferrosilicon-based materials, ferroaluminum-based materials, pure iron, Parmalloy, and super-magnetostrictive materials. This allows the upper casing 10 to function as a magnetic path during the operation of the magnetostrictive load sensor 100. This will be discussed in detail below.

Note that the upper casing 10 is preferably formed by forging. The above-mentioned magnetic material is preferably heat-treated in the range of temperatures from about 600° C. to about 1,100° C. The upper casing 10 is preferably heat-treated at a temperature higher than that for the bar-shaped member 20b of the lower casing 20 described below.

The elastic cover 30 preferably having a circular shape is preferably made of an elastic material such as silicone resin. During the assembly of the magnetostrictive load sensor 100, the elastic cover 30 is attached to the upper end of the upper casing 10 so as to cover the opening 10H (see the arrow F1 in FIG. 3).

The lower casing 20 includes a disk-shaped member 20a and a bar-shaped member 20b that are integral with each other. The disk-shaped member 20a has a bobbin base 22. The bobbin base 22 is provided with a casing flange 21 extending around a lower end.

The columnar bar-shaped member 20b is arranged so as to extend upwardly from a central portion of the bobbin base 22. A lower end of the bar-shaped member 20b expands outwardly with a downwardly increasing diameter. That is, an outer peripheral surface of the lower end of the bar-shaped member 20b is curved in a concave configuration, and connected to an upper surface of the bobbin base 22. The lower end of the bar-shaped member 20b will hereinafter be referred to as an expanded portion 23r.

Examples of material for use as the lower casing 20 include magnetic materials such as ferrous materials, ferrochrome-based materials, ferronickel-based materials, ferrocobalt-based materials, ferrosilicon-based materials, ferroaluminum-based materials, pure iron, Parmalloy, and super-magnetostrictive materials. This allows the lower casing 20 to function as a magnetic path during the operation of the magnetostrictive load sensor 100, as will be discussed in detail below. Note that the magnetostriction of the bar-shaped member 20b of the lower casing 20 has been removed by heat treatment.

As shown in FIG. 3 and FIG. 4, the bobbin 50 has a cylindrical shaft 50J (FIG. 4), an upper flange 51, and a lower flange 53.

The upper flange 51 preferably has a disk shape and is integrally disposed on an upper end of the cylindrical shaft 50J. Further, an annular projection 52 (FIG. 3) is integrally disposed on a central portion of an upper surface of the upper flange 51. The annular projection 52 is mounted with the elastic ring 60 (see the arrow F2 in FIG. 3). The elastic ring 60 is preferably made of an elastic material such as silicone resin.

The lower flange 53 preferably has a disk shape and is integrally disposed on a lower end of the cylindrical shaft 50J. Thus, the upper flange 51 and the lower flange 53 face opposite to each other. The lower flange 53 has a size almost equal to that of the bobbin base 22 of the lower casing 20.

A conducting wire is wound around the cylindrical shaft, 50J between the upper flange 51 and the lower flange 53 to form the coil 40. In the present preferred embodiment, the coil 40 functions not only as an exciting coil but also as a detecting coil, as described in detail below. An outer periphery of the coil 40 is attached with a tape 41 (FIG. 3) in order to prevent unwinding of the coil 40. The tape 41 is not shown in FIG. 4.

An outer periphery of the lower flange 53 is provided with a lead wire outlet 54 and a bobbin notch 55 at predetermined positions. A bottom surface of the lower flange 53 is provided with a lead wire guide groove 56 that extends from the bobbin notch 55 to the lead wire outlet 54 (FIG. 4).

The bobbin notch 55 is formed by notching a portion of the lower flange 53 in the direction of an inner periphery of the lower flange 53 from an outer periphery. As shown in FIG. 4, the lead wire 40R of the coil 40 that is wound around the cylindrical shaft 50J is pulled downward through the bobbin notch 55. The lead wire 40R being pulled out is guided to the lead wire outlet 54 via the lead wire guide groove 56.

The lead wire outlet 54 has a cross section (in the perpendicular direction) of an approximate horse-shoe shape that has an open bottom surface, and is arranged so as to project outwardly from the outer periphery of the lower flange 53. An inner space of the lead wire outlet 54 defines a portion of the lead wire guide groove 56.

This allows the lead wire 40R that extends from the coil 40 to be taken outside of the bobbin 50 through the lead wire outlet 54.

Note that in FIG. 4, the lead wire 40R in the region of the lead wire guide groove 56 is preferably covered with the shrinkage tube 70. That is, the lead wire 40R covered with the shrinkage tube 70 is fitted into the lead wire guide groove 56. This prevents disconnection of the lead wire 40R that passes through the lead wire guide groove 56 even in the event of vibrations or the like during the assembly or operation of the magnetostrictive load sensor 100.

In the present preferred embodiment, the bobbin notch 55 and the lead wire outlet 54 are disposed at positions that are shifted approximately 90 degrees from each other with respect to the center of the lower flange 53.

Similarly to the expanded portion 23r of the bar-shaped member 20b, a through hole 50H in the cylindrical shaft 50J that extends in the vertical direction, which is arranged through the axial center of the coil 40, is formed so as to expand outwardly with a downwardly increasing diameter. That is, an inner peripheral surface of a lower end of the through hole 50H is curved to have a concave configuration, and connected with the bottom surface of the lower flange 53. The lower end of the through hole 50H will hereinafter be referred to as an expanded portion 50r.

During the assembly of the magnetostrictive load sensor 100, the bar-shaped member 20b of the lower casing 20 is inserted into the through hole 50H (see the arrow F3 in FIG. 3) in the bobbin 50 with the above-described configuration. The bobbin 50 is thus mounted on the bobbin base 22 of the lower casing 20.

In this state, the lower casing 20 is covered with the upper casing 10 so that they are connected with each other (see the arrow F4 in FIG. 3). Connection of the upper casing 10 and the lower casing 20 is performed as follows.

First, the positions of the bar-shaped member 20b of the lower casing 20 and the opening 10H of the upper casing 10 are adjusted relative to each other. Then, the position of the lead wire outlet 54 of the bobbin 50 that is mounted on the bobbin base 22 and the position of the notch 10W of the upper casing 10 are adjusted relative to each other.

Although not stated above, the vertical length (height) of the bar-shaped member 20b of the lower casing 20 is preferably slightly longer than the vertical lengths (heights) of the bobbin 50 and the upper casing 10.

In addition, the notch 10W of the upper casing 10 and the lead wire outlet 54 of the bobbin 50 are constructed so that they can be fitted with each other. As described above, the lead wire outlet 54 has a cross section of an approximate horse-shoe shape. Accordingly, the notch 10W is also formed to have an approximate horse-shoe shape. Each of the notch 10W and the lead wire outlet 54 therefore has an arcuate corner, which facilitates fitting the notch 10W and the lead wire outlet 54 with each other.

As described above, with the upper casing 10 and the lower casing 20 being positioned relative to each other, the casing press-fit portion 11 of the upper casing 10 is press fitted onto the casing flange 21.

In this way, the upper casing 10 and the lower casing 20 are connected, so that the coil 40, bobbin 50, and elastic ring 60 are housed in the casing K. In addition, the upper end of the bar-shaped member 20b covered with the elastic cover 30 projects upwardly through the opening 10H of the upper casing 10.

Further, the notch 10W and the lead wire outlet 54 are fitted with each other. Thus, the lead wire 40R of the coil 40 inside the casing K is extended of the casing K through the lead wire outlet 54.

The lead wire 40R that extends from the magnetostrictive load sensor 100 is connected to peripheral circuits not shown in the drawings, such as an oscillating circuit, a rectifying circuit, an amplifying circuit, and Central Processing Unit (CPU).

(3) Inside Configuration of Magnetostrictive Load Sensor

Figure 5:
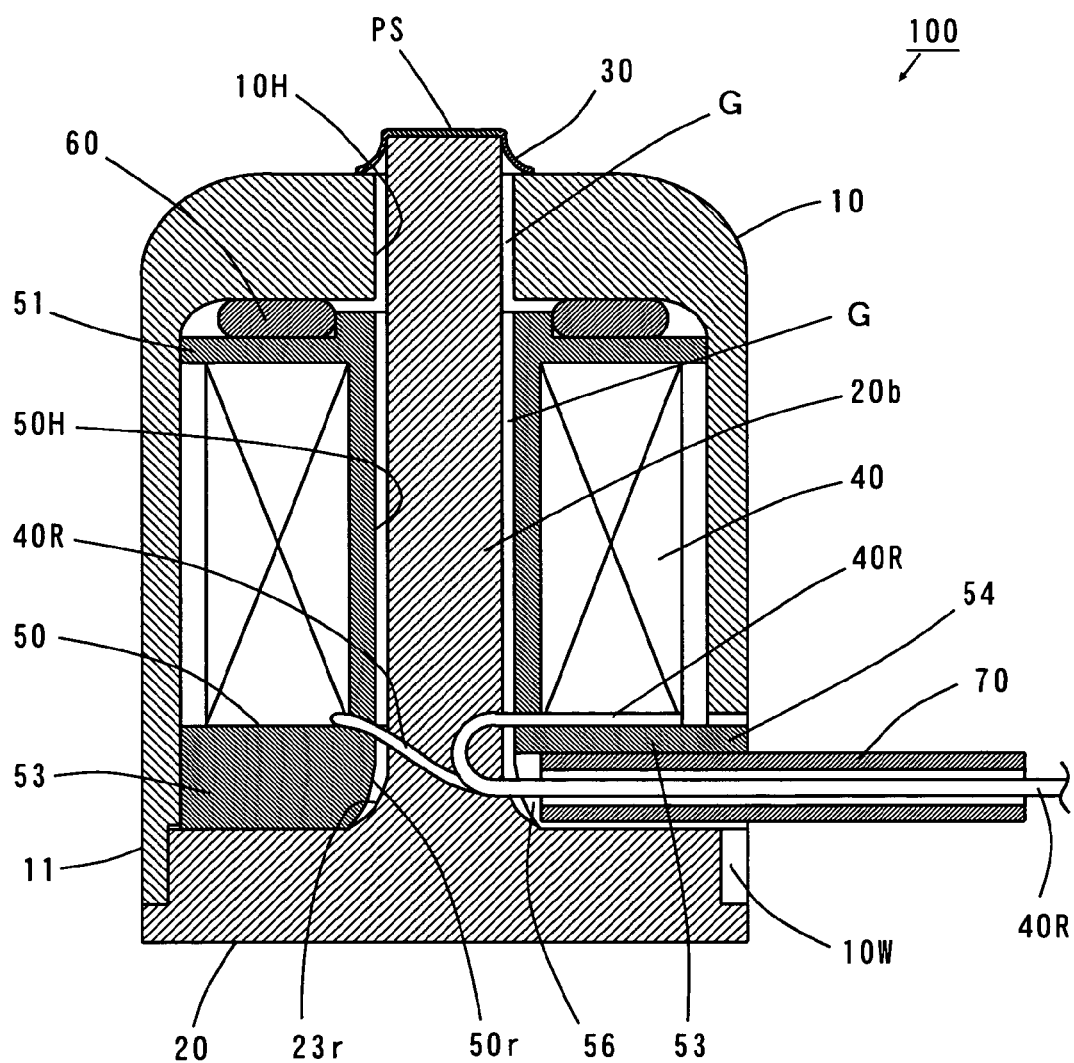
FIG. 5 is a detailed cross section of the magnetostrictive load sensor of FIG. 1 along the line A-A.

Referring now to FIG. 5, detailed configurations of the lead wire outlet 54, expanded portion 23r of the bar-shaped member 20b, and expanded portion 50r of the through hole 50H in the magnetostrictive load sensor 100 manufactured in the foregoing manner will be described.

FIG. 5 is a detailed cross section of the magnetostrictive load sensor 100 along the line A-A of FIG. 1. As shown in FIG. 5, the lead wire outlet 54 projects from an outer periphery of the lower flange 53 by a length substantially equal to the thickness of a side wall of the upper casing 10 (FIG. 3).

Thus, upon connection of the upper casing 10 and the lower casing 20, an end of the lead wire outlet 54 and an outer peripheral surface of the upper casing 10 are disposed on substantially an equal plane in the vertical direction.

This allows the lead wire 40R to be extended directly from the upper casing 10 in the magnetostrictive load sensor 100, thus realizing a reduction in the size of the magnetostrictive load sensor 100.

An outer peripheral surface of the expanded portion 23r of the bar-shaped member 20b, in its perpendicular cross section, is downwardly curved with a predetermined radius of curvature. Also, an inner peripheral surface of the expanded portion 50r of the bobbin 50, in its perpendicular cross section, is downwardly curved with a predetermined radius of curvature.

The outer peripheral surface of the expanded portion 23r of the bar-shaped member 20b has a different radius of curvature from that of the inner peripheral surface of the expanded portion 50r of the through hole 50H. More specifically, the radius of curvature of the outer peripheral surface of the expanded portion 23r is preferably smaller than that of the inner peripheral surface of the expanded portion 50r in the cross section of the magnetostrictive load sensor 100 along the line A-A of FIG. 1.

The diameter of a lowermost end of the expanded portion 50r of the through hole 50H is preferably substantially equal to that of a lowermost end of the expanded portion 23r of the bar-shaped member 20b. The diameter of the expanded portion 50r of the through hole 50H gradually becomes greater than that of the expanded portion 23r of the bar-shaped member 20b in an upward direction from the lowermost end of the expanded portion 50r of the through hole 50H.

In this way, the diameter of the lowermost end of the expanded portion 50r of the through hole 50H is substantially equal to that of the lowermost end of the expanded portion 23r of the bar-shaped member 20b. This allows the position of the bar-shaped member 20b to be automatically adjusted relative to the through hole 50H such that the central axes of the bar-shaped member 20b and the through hole 50H coincide with each other.

As a result, a uniform gap G is formed between the inner peripheral surface of the through hole 50H in the bobbin 50 and the outer peripheral surface of the bar-shaped member 20b. A uniform gap G is also formed between the inner peripheral surface of the opening 10H in the upper casing 10 and the outer peripheral surface of the bar-shaped member 20b.

As described above, in the magnetostrictive load sensor 100 according to the present preferred embodiment, the bobbin 50 is easily and accurately positioned relative to the bar-shaped member 20b, thus providing an improvement to the workability of assembling the magnetostrictive load sensor 100.

(4) Operation of Magnetostrictive Load Sensor

Figure 6:
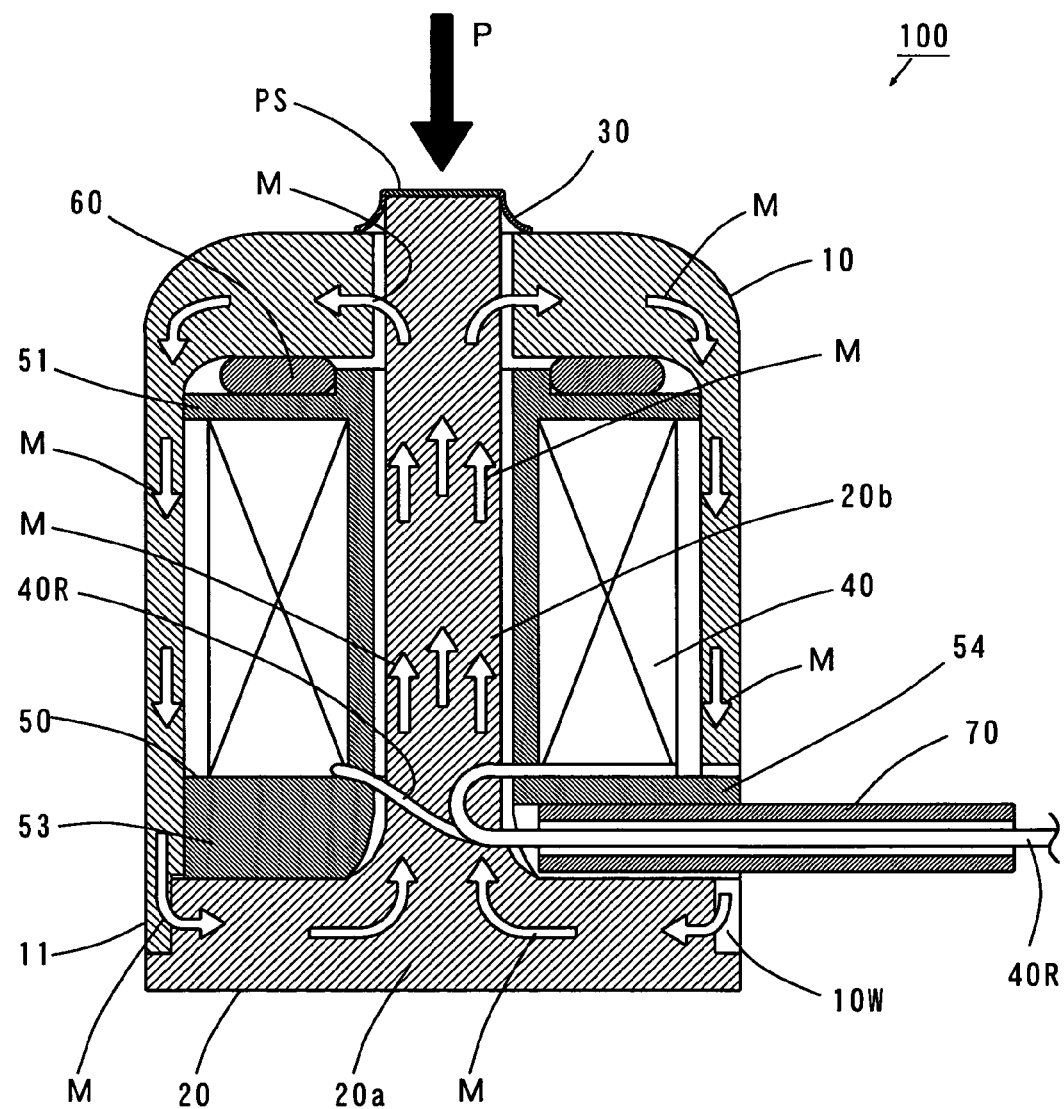
FIG. 6 is a diagram for use in illustrating the operation of the magnetostrictive load sensor of FIG. 1.

FIG. 6 is a diagram for use in illustrating the operation of the magnetostrictive load sensor 100 of FIG. 1.

As stated above, the lead wire 40R that extends from the magnetostrictive load sensor 100 is connected to peripheral circuits, which are not shown.

During operation of the magnetostrictive load sensor 100, alternating current is passed to the coil 40 through the lead wire 40R from a peripheral circuit not shown. More specifically, the coil 40 is driven by the oscillating circuit as a peripheral circuit. During drive, the coil 40 functions as an exciting coil to magnetize the bar-shaped member 20b. This causes the upper casing 10 and the disk-shaped member 20a to function as a magnetic path.

In FIG. 6, the outline arrows M indicate the direction of a magnetic field generated in the magnetostrictive load sensor 100 during the drive of the coil 40.

In this state, application of a load to the pressure sensor PS of the magnetostrictive load sensor 100, as indicated by the thick arrow P, causes a compressive force acting on the bar-shaped member 20b. With a compressive force acting on the bar-shaped member 20b, the magnetic permeability of the bar-shaped member 20b decreases due to reverse magnetostrictive effect, causing a change in the inductance of the coil 40.

When the bar-shaped member 20b is made of a super-magnetostrictive material as mentioned above, the magnetostrictive effect is from several 100 to several 1,000 ppm. When the bar-shaped member 20b is made of a magnetic material other than super-magnetostrictive materials, the magnetostrictive effect is several 10 ppm or less.

This results in a change in the induced electromotive force (voltage) generated across the coil 40. In this case, the coil 40 functions as a detecting coil. The change in the voltage across the coil 40 is detected by a peripheral circuit (not shown) through the lead wire 40R.

More specifically, the voltage across the coil 40 is fed to the rectifying circuit through the lead wire 40R. The voltage that is rectified by the rectifying circuit is then amplified by the amplifying circuit. Based on the amplified voltage, the CPU calculates a compressive force acting on the bar-shaped member 20b. In this way, a load applied to the pressure sensor PS of the magnetostrictive load sensor 100 is detected.

(5) Effects of Preferred Embodiment

In the magnetostrictive load sensor 100 according to the present preferred embodiment, the bar-shaped member 20b, to which a load is applied, is integral with the disk-shaped member 20a of the lower casing 20. This allows the bar-shaped member 20b of the lower casing 20 to be inserted into the through hole 50H in the bobbin 50 accurately and easily during the assembly of the magnetostrictive load sensor 100, thereby simplifying the manufacture of the magnetostrictive load sensor 100.

Moreover, as described above, the diameter of the lowermost end of the expanded portion 50r of the through hole 50H is preferably substantially equal to that of the lowermost end of the expanded portion 23r of the bar-shaped member 20b. Thus, during insertion of the bar-shaped member 20b of the lower casing 20 into the through hole 50H in the bobbin 50, the position of the bar-shaped member 20b relative to the through hole 50H is automatically adjusted so that the central axes of the bar-shaped member 20b and the through hole 50H coincide with each other. This allows the bobbin 50 and the bar-shaped member 20b to be maintained in accurate positions.

As a result, during the press fit of the upper casing 10 with the lower casing 20, the bobbin 50 and the bar-shaped member 20b are prevented from shifting from their respective positions. This reduces variations in the sensitivities of magnetostrictive load sensors 100, and therefore improves reliability.

In addition, the elastic ring 60 mounted on the bobbin 50 is positioned between the upper surface of the bobbin 50 and the inner surface of the upper end of the upper casing 10. This prevents the bobbin 50 from shifting in the vertical direction in the event of vibrations that occur during the press fit of the upper casing 10 with the lower casing 20, while preventing disconnection of the lead wire 40R.

This ensures that the bobbin 50 and the bar-shaped member 20b are prevented from shifting from the irrespective positions, leading to a sufficient decrease in variations in the sensitivities of magnetostrictive load sensors 100, and therefore a sufficient improvement in reliability.

Moreover, the notch 10W of the upper casing 10 reduces the load required to press fit the casing press-fit portion 11 of the upper casing 10 onto the casing flange 21 (the load will hereinafter be referred to as a press-fit load). This results in a decrease in the residual stress generated in the upper casing 10.

During the press fit of the casing press-fit portion 11 of the upper casing 10 onto the casing flange 21, a load is applied to the upper end of the upper casing 10. Meanwhile, during this press fit, a press-fit load is not applied to the upper end of the bar-shaped member 20b, to which a load is applied during operation of the magnetostrictive load sensor 100.

Accordingly, during the press fit of the casing press-fit portion 11, generation of a residual stress in the bar-shaped member 20b is decreased. As a result, changes in the magnetic properties of the bar-shaped member 20b due to residual stress are minimized, thus leading to a sufficient decrease in variations in the sensitivities of magnetostrictive load sensors 100.

In addition, connection of the casing press-fit portion 11 around the outer periphery of the disk-shaped member 20a ensures a large cross section area of the upper casing 10 as a magnetic path. Accordingly, even if a residual stress is generated in the casing press-fit portion 11 by the press fit, an increase in the magnetic resistance is small.

Moreover, the upper casing 10 is heat-treated at a temperature higher than the temperature for the bar-shaped member 20b of the lower casing 20. The upper casing 10 thus has a lower hardness than that of the bar-shaped member 20b. This allows the casing press-fit portion 11 of the upper casing 10 to be press fitted onto the casing flange 21 with a small load. As a result, the upper casing 10 and the lower casing 20 are prevented from shifting from their respective positions during the press fit operation, while the residual stress generated in the upper casing 10 is further reduced. This leads to a further decrease in variations in the sensitivities of magnetostrictive load sensors 100.

Note that the magnetic resistance of a magnetic material decreases with increasing heat treatment temperature. This means that when the heat treatment temperature for the upper casing 10 is higher than that for the bar-shaped member 20b, the magnetic resistance of the bar-shaped member 20b is greater than that of the upper casing 10. In this case, the proportion of the magnetic resistance of the bar-shaped member 20b to that of the whole magnetic path is increased. This results in improved sensitivity of the magnetostrictive load sensor 100.

In addition, the lead wire 40R of the coil 40 is extended outside the upper casing 10 without passing through a pin, thus allowing the circumferential length of the notch 10W to be shorter than the vertical length thereof. That is, the circumferential length of the notch can be reduced.

This increases the cross section area of the upper casing 10 as a magnetic path. An increase in the magnetic resistance of the upper casing 10 is thus further reduced. This results in improved the sensitivity of the magnetostrictive load sensor 100.

Moreover, the lead wire 40R is extended through the lead wire outlet 54 in the coil 40. The lead wire 40R is thus protected with the lead wire outlet 54 during the press fit of the casing press-fit portion 11 of the upper casing 10 onto the casing flange 21. This prevents the application of a load to the lead wire 40R.

In this way, disconnection of the lead wire 40R during the assembly of the magnetostrictive load sensor 100 is prevented, thus leading to improved yields of magnetostrictive load sensors 100, and therefore lower manufacturing cost.

In addition, the elastic cover 30 is attached on the upper end of the upper casing 10. The elastic cover 30 thus seals off the gap G formed between the inner peripheral surface of the through hole 50H and the outer peripheral surface of the bar-shaped member 20b and the gap G between the inner peripheral surface of the opening 10H and the outer peripheral surface of the bar-shaped member 20b. This provides dust and water resistances to the magnetostrictive load sensor 100 to improve the reliability thereof.

As described above, the magnetostrictive load sensor 100 that is reliable, easy to manufacture, and smaller in size is provided according to the present preferred embodiment.

(6) Another Example of Configuration of Magnetostrictive Load Sensor

The configuration of a magnetostrictive load sensor according to this example is different from that of the magnetostrictive load sensor 100 of FIG. 1 in the following ways. Note that the magnetostrictive load sensor in this example has an external shape substantially the same as that of the magnetostrictive load sensor 100 of FIG. 1.

Figure 7:
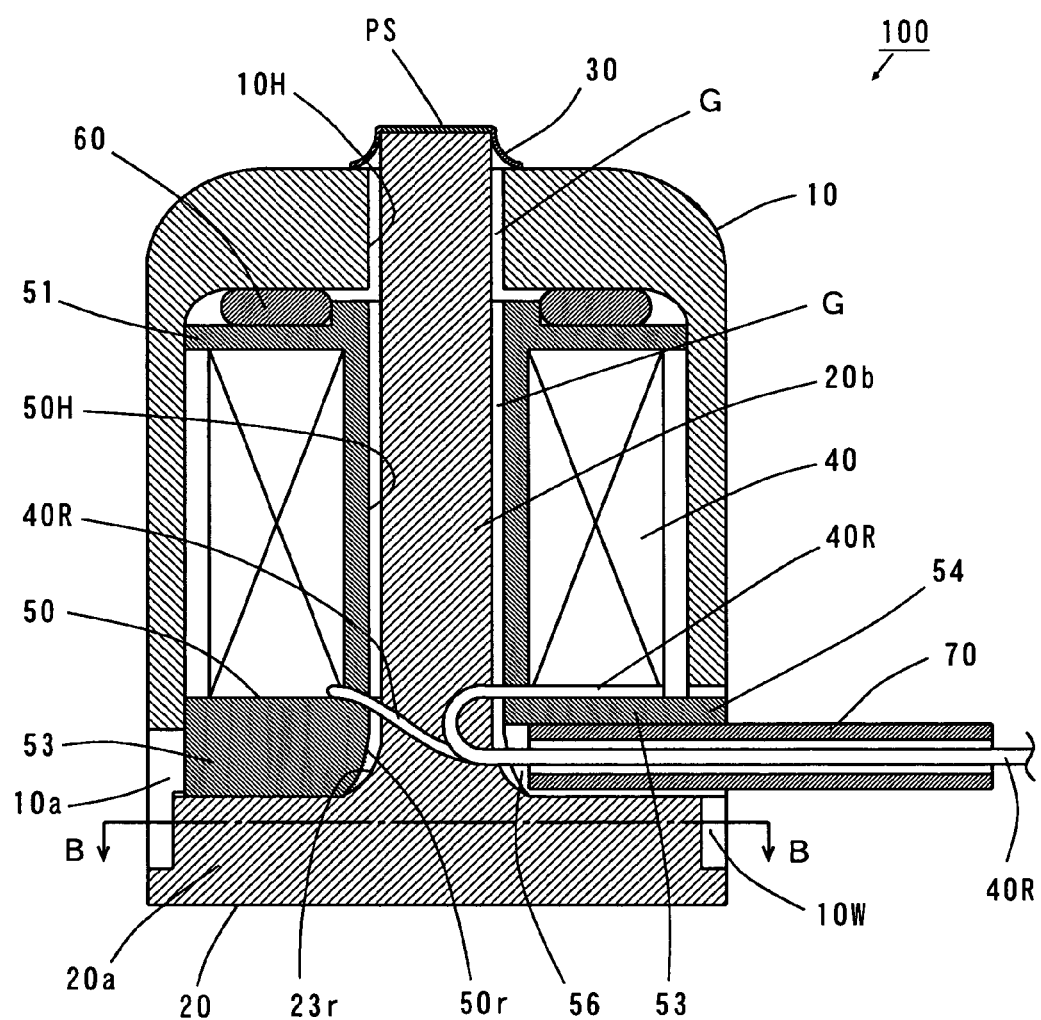
FIG. 7 is a diagram for use in illustrating another example of the configuration of a magnetostrictive load sensor according to a preferred embodiment of the present invention.
Figure 8A:
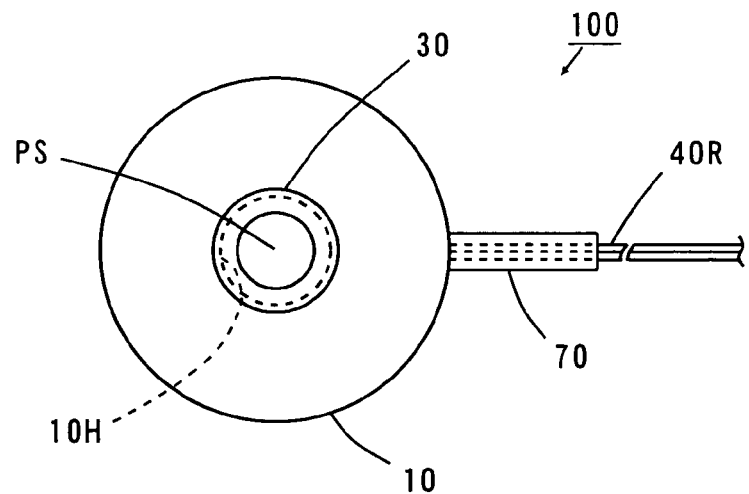
FIG. 8a and FIG. 8b are diagrams for use in illustrating the other example of the configuration of a magnetostrictive load sensor according to a preferred embodiment of the present invention.
Figure 8B:
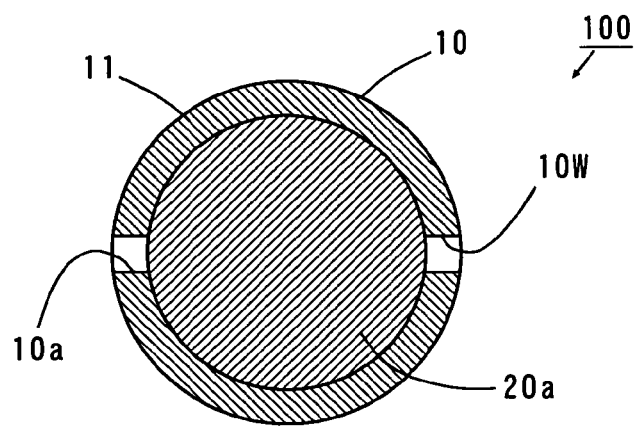

FIG. 7, FIG. 8a, and FIG. 8b are diagrams for use in illustrating another example of the configuration of a magnetostrictive load sensor according to a preferred embodiment of the present invention.

FIG. 7 shows a perpendicular cross section of the magnetostrictive load sensor 100 according to this example. FIG. 7 corresponds to the cross section along the line A-A of FIG. 1. FIG. 8a shows a top view of the magnetostrictive load sensor 100, and FIG. 8b shows a cross section of the magnetostrictive load sensor 100 along the line B-B of FIG. 7.

As shown in FIG. 8a, the appearance of the magnetostrictive load sensor 100 of this example is preferably the same as that of the magnetostrictive load sensor 100 of FIG. 1 when viewed from the top.

As shown in FIG. 7 and FIG. 8b, the magnetostrictive load sensor 100 has an upper casing 10 in a different shape from that of the upper casing 10 in FIG. 1, as will now be described in detail.

Similarly to the upper casing 10 in FIG. 1, a lower end of the upper casing 10 is provided with a notch 10W for taking out a lead wire 40R.

The lower end of the upper casing 10 is also provided with a slit 10a. The slit 10a is disposed opposite to the notch 10W with respect to the central axis of the upper casing 10.

The vertical length of the slit 10a (height) is higher than that of a casing press-fit portion 11. The circumferential length of the slit 10a is shorter than the vertical length thereof.

In the magnetostrictive load sensor 100 of this example, the portion of the upper casing 10 except the notch 10W and the slit 10a on the lower end defines the casing press-fit portion 11.

The notch 10W and the slit 10a of the upper casing 10 allow a sufficient decrease in the press-fit load as compared to the press-fit load applied to the upper casing 10 in FIG. 1. This further reduces the residual stress generated in the upper casing 10.

As a result, change in the magnetic properties of the upper casing due to residual stress is further reduced, leading to a further decrease in variations in the sensitivities of magnetostrictive load sensors 100.

(7) Still Another Example of Configuration of Magnetostrictive Load Sensor

A lower end of an upper casing 10 may be provided with a plurality of slits 10a as described below.

Figure 9:
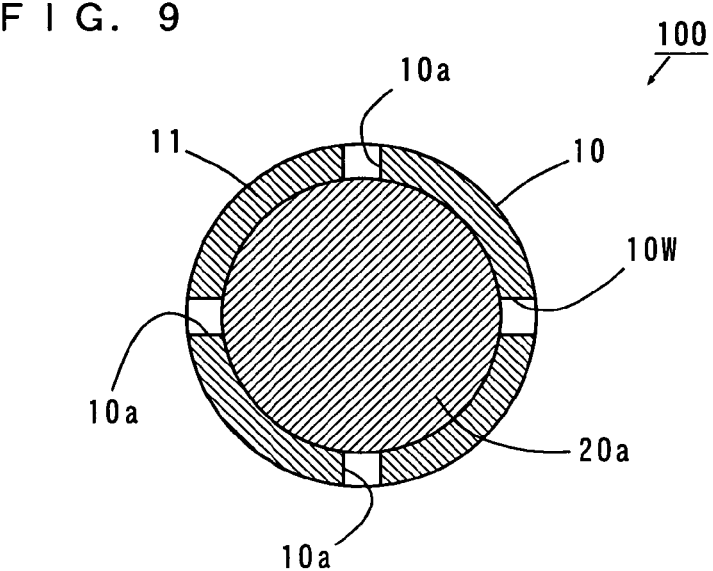
FIG. 9 is a diagram for use in illustrating a still another example of the configuration of a magnetostrictive load sensor according to a preferred embodiment of the present invention.

FIG. 9 is a diagram for use in illustrating a still another example of the configuration of a magnetostrictive load sensor according to another preferred embodiment of the present invention. FIG. 9 shows a horizontal cross section of the magnetostrictive load sensor 100 according to this example. FIG. 9 corresponds to the cross section of the line B-B of FIG. 7.

The lower end of an upper casing 10 in FIG. 9 is provided with a notch 10W and three slits 10a that are arranged at substantially equal distances. More specifically, the notch 10W and three slits 10a are positioned approximately 90° away from one another with respect to the central axis of the upper casing 10.

The notch 10W and three slits 10a of this upper casing 10 allow a further decrease in the press-fit load as compared to the press-fit load applied to the upper casing 10 in FIG. 7. This further decreases the residual stress generated in the upper casing 10.

As a result, changes in the magnetic properties of the upper casing 10 due to residual stress are further reduced, thus leading to a sufficient decrease in variations in the sensitivities of magnetostrictive load sensors 100.

In addition, the press-fit load can be uniformly distributed across the whole lower end of the upper casing 10.

This prevents deformation of the casing press-fit portion 11 during the press fit. Where the upper casing 10 is formed so that a horizontal cross section of its outer periphery becomes round, the upper casing 10 maintains the roundness even after the press fit.

The upper casing 10 may be provided with two slits 10a or four or more slits 10a other than the three described above. In that case, the press-fit load is decreased according to the number of slits 10a formed in the upper casing 10.

(8) Press-fit Load, Number of Slits, Thickness, and Heat Treatment Condition The magnitude of a press-fit load depends upon the number of slits 10a formed in the upper casing 10, the thickness of the upper casing 10, and the heat treatment condition for the upper casing 10.

The inventors of the present invention performed the following experiments in order to examine the relationship among the press-fit load, number of slits 10a, thickness, and heat treatment condition.

The inventors manufactured seven upper casings S1, S2, S3, S4, S5, S6, S7 that vary in the number of slits 10a, thickness, and heat treatment condition. The configuration and heat treatment condition of each of the upper casings S1 to S7 are as follows.

Manufacture of the upper casing S1 excluded heat-treatment at a higher temperature than that for the bar-shaped member 20b of the lower casing 20. The upper casing S1 was not provided with a slit 10a.

Manufacture of the upper casing S2 included heat treatment at a temperature higher than that for the bar-shaped member 20b. The upper casing S2 was not provided with a slit 10a. The upper casing S2 corresponds to the upper casing 10 in FIG. 1.

The manufacture of the upper casing S3 included heat treatment at a higher temperature than that for the bar-shaped member 20b. The upper casing S3 was provided with a slit 10a. The upper casing S3 corresponds to the upper casing 10 in FIG. 7.

The manufacture of the upper casing S4 included heat treatment at a higher temperature than that for the bar-shaped member 20b. The upper casing S3 was provided with three slits 10a. The upper casing S3 corresponds to the upper casing 10 in FIG. 9.

The manufacture of the upper casing S5 excluded heat treatment at a higher temperature than that for the bar-shaped member 20b. The upper casing S5 was provided with a slit 10a similarly to the upper casing S3.

The manufacture of the upper casing S6 excluded heat treatment at a higher temperature than that for the bar-shaped member 20b. The upper casing S6 was provided with three slits 10a similarly to the upper casing S4.

The thickness of the outer periphery of each of the above-described upper casings SI to S6 was uniformly 1.0 mm.

The manufacture of the upper casing S7 included heat treatment at a higher temperature than that for the bar-shaped member 20b. The upper casing S7 was not provided with a slit 10a. The thickness of the outer periphery of the upper casing S7 was 0.6 mm, which was smaller than that of the other upper casings S1 to S6.

The upper casings S1 to S7 thus manufactured were measured for press-fit load as they were press fitted onto the respective lower casings 20.

Figure 10:
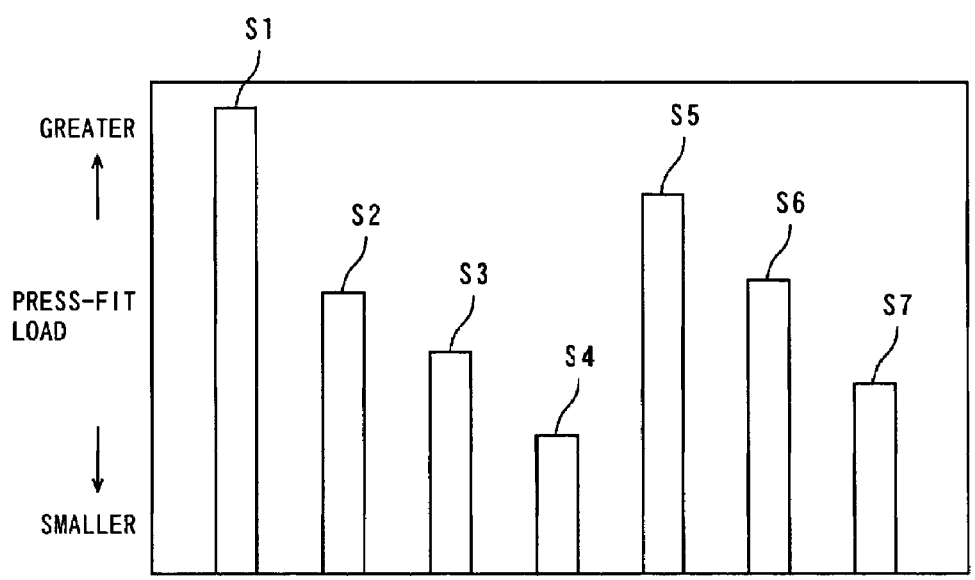
FIG. 10 is a graph showing the experimental results concerning relationships among the press-fit load, number of slits, thickness, and heat treatment condition.

FIG. 10 is a graph showing the experimental results concerning the relationship among the press-fit load, number of slits 10a, thickness, and heat treatment condition. In FIG. 10, the ordinate represents the press-fit load, and the abscissa represents each of the upper casings S1 to S7.

In FIG. 10, the abscissa represents the symbols of the upper casings S1 to S7 as well as the number of slits 10a, heat treatment condition, and thickness for each of the upper casings S1 to S7.

As shown in FIG. 10, the press-fit load for the upper casing S1, without heat treatment at a higher temperature than that for the bar-shaped member 20b and formation of a slit 10a, is much greater than the press-fit loads for the other upper casings S2 to S7.

In contrast, the press-fit loads for the upper casing S5, S6 with a slit 10a or slits 10a are smaller as the number of slits 10a increases.

As for the upper casings S2, S3, S4, which were heat-treated at a higher temperature than that for the bar-shaped member 20b, the press-fit loads are even smaller.

Furthermore, the press-fit load for the upper casing S7, which was heat-treated at a higher temperature than that for the bar-shaped member 20b, and smaller in thickness, is about half the press-fit load for the upper casing S1.

The foregoing results reveal that the press-fit load can be reduced by setting the thickness of the upper casing 10 small, applying heat treatment to the upper casing 10 at a higher temperature than that for the bar-shaped member 20b, and forming a greater number of slits 10a in the upper casing 10.

Accordingly, the workability of assembling a magnetostrictive load sensor 100 can be improved by setting the thickness of the upper casing 10 to be relatively small, applying heat treatment to the upper casing 10 at a higher temperature than that for the bar-shaped member 20b, and forming a greater number of slits 10a in the upper casing 10.

It should be noted that although reducing the thickness of an upper casing 10 increases the magnetic resistance, the increase in the magnetic resistance can be lowered by applying heat treatment to the upper casing 10 at a higher temperature than that for the bar-shaped member 20b.

(9) Variations in Sensitivity and Impedance

In the various preferred embodiments of the present invention, the sensitivity of a magnetostrictive load sensor 100 is determined by dividing a change in the impedance of the coil 40 when a given load is applied to the magnetostrictive load sensor 100 (impedance change $\Delta Z$) by the impedance of the coil 40 when no load is applied to the magnetostrictive load sensor 100 (initial impedance $Z_0$).

Variations in the sensitivities of magnetostrictive load sensors 100 depend upon the presence or absence of slits 10a in the upper casing 10, the thickness of the upper casing 10, and heat treatment condition for the upper casing 10. Similarly, variations in the initial impedances $Z_0$ of magnetostrictive load sensors 100 also depend upon the presence or absence of slits 10a in the upper casing 10, the thickness of the upper casing 10, and heat treatment condition for the upper casing 10.

The inventors of the present invention performed following experiments in order to examine the relationship among the variations in the sensitivities of magnetostrictive load sensors 100, variations in the initial impedances $Z_0$, press-fit load, number of slits 10a, thickness, and heat treatment condition.

The inventors manufactured two kinds of upper casings T1, T2 that varied in the number of slits 10a, thickness, and heat treatment condition. The configuration and heat treatment condition of each of the upper casings T1, T2 are as follows.

The manufacture of the upper casing T1 excluded heat treatment at a higher temperature than that for the bar-shaped member 20b of the lower casing 20. The upper casing T1 was not provided with a slit 10a. The thickness of the upper casing T1 was 1.0 mm. The upper casing T1 corresponds to the aforementioned upper casing S1.

The manufacture of the upper casing T2 included heat treatment at a higher temperature than that for the bar-shaped member 20b, and forming a slit 10a or slits 10a or included heat treatment at a higher temperature than that for the bar-shaped member 20b, and reducing the thickness. The upper casing T2 corresponds to the aforementioned upper casing S3, S4 or S7. The thickness of the upper casing T2 was reduced to 0.6 mm.

A large number of upper casings T1, T2 described above were manufactured for mass-production of magnetostrictive load sensors 100. Each of the volume-produced magnetostrictive load sensors 100 was measured for initial impedance $Z_0$ of the coil 40. Also, the impedance change $\Delta Z$ from the initial impedance $Z_0$ was measured by applying a 600 N load to each of the magnetostrictive load sensors 100. The sensitivity of each magnetostrictive load sensor 100 was thus evaluated.

Figure 11A:
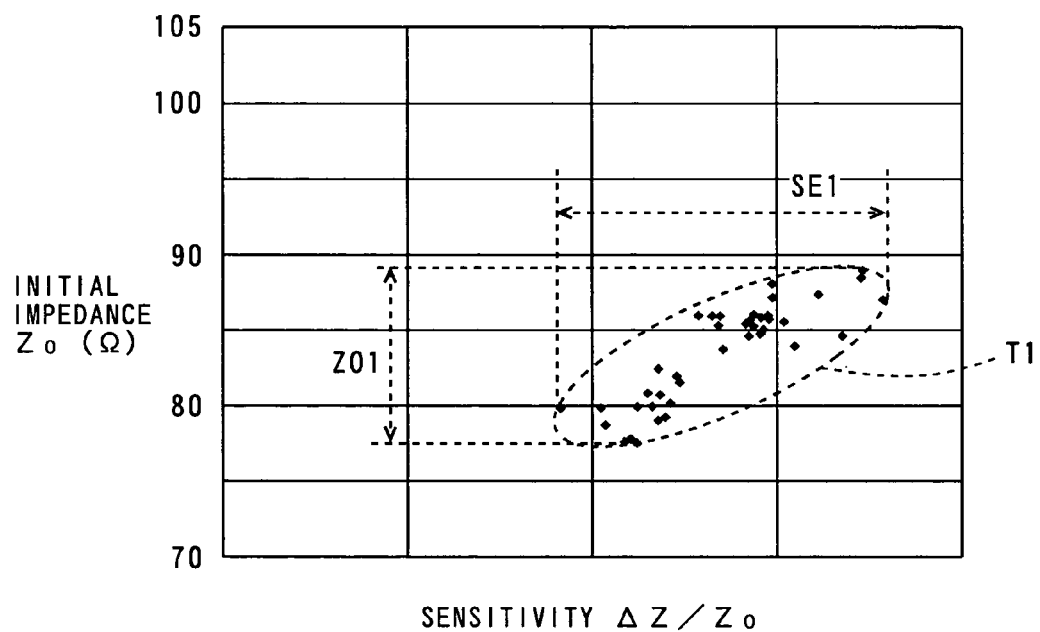
FIG. 11a and FIG. 11b are graphs showing the variations in the sensitivities and the variations in the initial impedances of magnetostrictive load sensors.
Figure 11B:
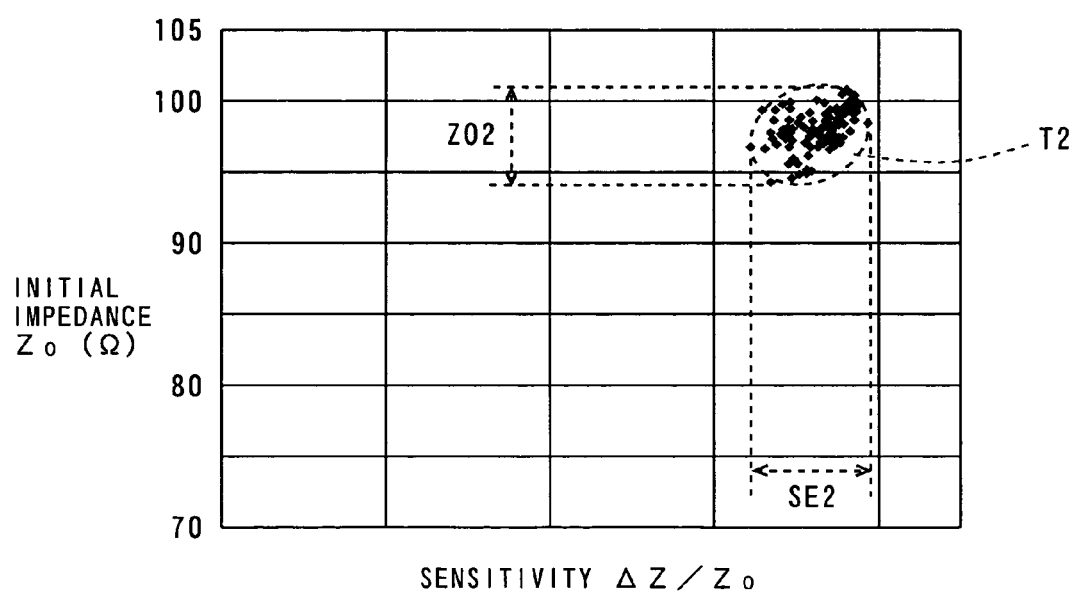

FIG. 11a and FIG. 11b are graphs each showing the variations in the sensitivities and the variations in the initial impedances $Z_0$ of the magnetostrictive load sensors 100. In each of FIG. 11a and FIG. 11b, the ordinate represents the initial impedances $Z_0$, and the abscissa represents the sensitivities of the magnetostrictive load sensors 100.

In FIG. 11a, the range of variations in the sensitivities and the range of variations in the initial impedances $Z_0$ for magnetostrictive load sensors 100 with the upper casings T1 are indicated by the dotted line T1.

For the magnetostrictive load sensors 100 with the upper casings T1, the sensitivities varied over a range SE1 of approximately 50%. Also, the initial impedances $Z_0$ varied over a range Z01 of approximately 12 $\Omega$.

In FIG. 11b, the range of variations in the sensitivities and the range of variations in the initial impedances $Z_0$ for magnetostrictive load sensors 100 with the upper casings T2 are indicated by the dotted line T2.

For the magnetostrictive load sensors with the upper casings T2, the sensitivities varied over a range SE2 of approximately 20%. Also, the initial impedances $Z_0$ varied over a range Z02 of approximately 7 $\Omega$.

In addition to these magnetostrictive load sensors 100, the inventors measured magnetostrictive load sensors 100 with upper casings T3 described below for sensitivity variations.

Manufacture of an upper casing T3 included heat treatment at a higher temperature than that for the bar-shaped member 20b. The upper casing T3 was not provided with a slit 10a. The thickness of the upper casing T3 was 1.0 mm. The upper casing T3 corresponds to the aforementioned upper casing S2.

For the magnetostrictive load sensors with the upper casings T3, the sensitivities varied over a range of approximately 23% (not shown).

The foregoing results revealed that the magnetostrictive load sensors 100 with the upper casings T3 show less variations in sensitivity than the magnetostrictive load sensors 100 with the upper casings T1. The results also revealed that the magnetostrictive load sensors 100 with the upper casings T2 show even less variations in sensitivity than the magnetostrictive load sensors 100 with the upper casings T3.

In this way, the variations in the sensitivities of magnetostrictive load sensors 100 can be reduced by applying heat treatment to the upper casing 10 at a higher temperature than that for the bar-shaped member 20b, and can further be reduced by providing a slit 10a or slits 10a in the upper casing 10 or reducing the thickness of the upper casing 10.

It was also revealed that the magnetostrictive load sensors 100 with the upper casings T2 show less variations in the initial impedance $Z_0$ than the magnetostrictive load sensors 100 with the upper casings T1.

In this way, the variations in the initial impedances $Z_0$ of magnetostrictive load sensors 100 can be reduced by applying heat treatment to the upper casing 10 at a higher temperature than that for the bar-shaped member 20b, and can further be reduced by providing a slit 10a or slits 10a in the upper casing 10 or reducing the thickness of the upper casing 10.

(10) Other Preferred Embodiments

The upper casing 10 in the magnetostrictive load sensor 100 according to the above-described preferred embodiments preferably has an approximate bell shape with a round horizontal cross section. However, the upper casing 10 may alternatively have an approximate bell shape with an overall horizontal cross section or may have an approximate rectangular shape.

Also, the vertical length of the bar-shaped member 20b in the lower casing 20 is preferably longer than the vertical lengths of the bobbin 50 and the upper casing 10. However, the relationship between the vertical length of the bar-shaped member 20b and the vertical lengths of the bobbin 50 and the upper casing 10 is not limited to the example shown above. For example, the vertical length of the bar-shaped member 20b of the lower casing 20 may be the same as that of the upper casing 10.

Alternatively, the vertical length of the bar-shaped member 20b of the lower casing 20 may be shorter than that of the upper casing 10. In that case, the bar-shaped member 20b does not project through the opening 10H of the upper casing 10. A load is thus applied to the pressure sensor PS by means of other member.

Moreover, the bar-shaped member 20b may have any suitable shape other than a cylindrical shape, such as a square prism or a cylindroid shape.

(11) Correspondence Between Each Claim Element and Each Component in the Preferred Embodiments In the magnetostrictive load sensor 100 according to the above-described preferred embodiments, the through hole 50H in the bobbin 50 corresponds to a through hole; the coil 40 and the bobbin 50 correspond to a coil; the bar-shaped member 20b corresponds to a bar-shaped member; the bobbin base 22 corresponds to a base; the opening 10H in the upper casing 10 corresponds to an opening; and the upper casing 10 corresponds to a casing member.

The casing press-fit portion 11 corresponds to a portion of the casing member that is fitted with the base; the notch 10W in the upper casing 10 corresponds to a notch; the substantially perpendicular direction that is substantially parallel to the bar-shaped member 20b corresponds to a first direction, and the horizontal direction corresponds to a second direction.

The lower flange 53 corresponds to a flange; the conducting wire and the lead wire 40R forming the coil 40 correspond to a conducting wire; the lead wire outlet 54 corresponds to a conducting wire outlet; and the lead wire guide groove 56 corresponds to a guide groove.

The shrinkage tube 70 corresponds to a sheathing tube; the expanded portion 23r corresponds to an expanded portion; the end of the through hole 50H on the lower flange 53 side corresponds to an end of the through hole; and the elastic ring 60 corresponds to an elastic member.

Although the present invention has been described and illustrated in detail with reference to certain preferred embodiments thereof, it is clearly understood that the same is by way of illustration and example only and is not to be taken by way of limitation, the spirit and scope of the present invention being limited only by the terms of the appended claims.

What is claimed is:

1. A magnetostrictive load sensor comprising:
a coil with a through hole;
a bar-shaped member having a first end arranged to receive a load that is inserted into said through hole of said coil, and a second end, the bar-shaped member being made of a magnetic material;
a base that is integrally disposed on, and unitary with, said second end of said bar-shaped member so as to support said coil; and
a single casing member that is directly fitted with said base so as to house said coil, the single casing member having a first opening that allows said first end of said bar-shaped member to receive a load; wherein
the single casing member has an approximate bell shape including a second opening, larger than the first opening, that is directly fitted with said base.

2. The magnetostrictive load sensor according to claim 1, wherein said base and said casing member are each made of a magnetic material, and define a magnetic path of a magnetic field that is generated by said coil.

3. The magnetostrictive load sensor according to claim 1, wherein a portion of said casing member that is fitted with said base is provided with a notch allowing communication between an inside and an outside of said casing member.

4. The magnetostrictive load sensor according to claim 3, wherein a length of said notch in a first direction that is substantially parallel to said bar-shaped member is longer than a length of said notch in a second direction that is substantially perpendicular to said first direction.

5. The magnetostrictive load sensor according to claim 3, wherein said coil includes a bobbin with a flange that is supported on said base, and a conducting wire that is wound around said bobbin, said flange of said bobbin has a conducting wire outlet that defines a passage through which said conducting wire extending said coil is directed to the outside of said casing member, and said conducting wire outlet is arranged so as to fit into said notch.

6. The magnetostrictive load sensor according to claim 5, wherein said flange has a guide groove that guides said conducting wire to the passage of said conducting wire outlet.

7. The magnetostrictive load sensor according to claim 6, further including a sheathing tube that covers at least a region of said conducting wire that passes through said guide groove and the passage of said conducting wire outlet.

8. The magnetostrictive load sensor according to claim 1, wherein a portion of said casing member that is fitted with said base includes at least one slit.

9. The magnetostrictive load sensor according to claim 1, wherein a portion of said casing member that is fitted with said base includes a plurality of slits spaced from each other at substantially equal distances.

10. The magnetostrictive load sensor according to claim 1, wherein said bar-shaped member has on said second end an expanded portion with a cross section that gradually expands toward said base.

11. The magnetostrictive load sensor according to claim 10, wherein an end of said through hole on a side of said expanded portion of said bar-shaped member has a cross section that gradually expands toward said base.

12. The magnetostrictive load sensor according to claim 11, wherein a gap is provided between an outer surface of said bar-shaped member and an inner surface of said through hole, and a largest cross section of said expanded portion of said bar-shaped member has a size that is substantially equal to that of a largest cross section of said through hole.

13. The magnetostrictive load sensor according to claim 1, further including an elastic cover that is attached to said casing member so as to cover said first opening.

14. The magnetostrictive load sensor according to claim 1, further including an elastic member that is arranged between an inside end surface of said casing member and an end surface of said coil.

15. The magnetostrictive load sensor according to claim 1, wherein each of said casing member and said bar-shaped member is made of a heat treated material, and a heat treatment temperature of the heat treated material of said casing member is higher than a heat treatment temperature of the heat treated material of said bar-shaped member.

16. The magnetostrictive load sensor according to claim 1, wherein said base is a disk-shaped member having a width substantially equal to a largest width of said single casing member.

* * * * *